United States Patent
Josemans et al.

(10) Patent No.: US 12,270,653 B2
(45) Date of Patent: Apr. 8, 2025

(54) QUANTUM WEAK-VALUE BIREFRINGENT CORIOLIS VIBRATORY GYROSCOPE

(71) Applicants: Garrett K. Josemans, Fredericksburg, VA (US); Benjamin A. Baldwin, King George, VA (US)

(72) Inventors: Garrett K. Josemans, Fredericksburg, VA (US); Benjamin A. Baldwin, King George, VA (US)

(73) Assignee: United States of America, as represented by the Secretary of the Navy, Arlington, VA (US)

( * ) Notice: Subject to any disclaimer, the term of this patent is extended or adjusted under 35 U.S.C. 154(b) by 126 days.

(21) Appl. No.: 17/721,094

(22) Filed: Apr. 14, 2022

(65) Prior Publication Data
US 2024/0044648 A1  Feb. 8, 2024

(51) Int. Cl.
  *G01C 19/66* (2006.01)
  *G01C 19/5614* (2012.01)
  *G01C 19/5649* (2012.01)

(52) U.S. Cl.
  CPC ....... *G01C 19/661* (2013.01); *G01C 19/5614* (2013.01); *G01C 19/5649* (2013.01)

(58) Field of Classification Search
  CPC .............. G01C 19/661; G01C 19/5614; G01C 19/5649
  See application file for complete search history.

(56) References Cited

U.S. PATENT DOCUMENTS

| | | | |
|---|---|---|---|
| 4,276,518 A * | 6/1981 | Ferguson | H01S 3/082 372/105 |
| 4,628,734 A | 12/1986 | Watson | 73/505 |
| 5,430,342 A | 7/1995 | Watson | 310/316.01 |
| 8,213,010 B2 * | 7/2012 | Sivaprakasam | G01N 21/21 356/338 |
| 9,939,249 B1 * | 4/2018 | Spence | G02B 27/10 |
| 11,060,868 B2 | 7/2021 | Josemans | |
| 2006/0129486 A1 * | 6/2006 | Ohkuma | G09C 1/00 705/44 |
| 2007/0284414 A1 * | 12/2007 | Kopp | H05K 3/3442 228/101 |
| 2010/0257950 A1 * | 10/2010 | Yang | G01C 19/66 74/5.6 A |
| 2012/0105849 A1 * | 5/2012 | Sivaprakasam | G01N 21/21 356/338 |
| 2016/0291137 A1 * | 10/2016 | Sakimura | G01S 7/4815 |
| 2017/0207789 A1 * | 7/2017 | Czaplewski | H03L 5/00 |
| 2020/0240786 A1 * | 7/2020 | Josemans | G01C 19/5642 |

OTHER PUBLICATIONS

N. V. Lavrik et al. "Optically read Coriolis vibratory gyroscope . . . " *Microsyst. & Nanoeng.* 5 (47) 2019. https://www.nature.com/articles/s41378-019-0087-9.pdf.

(Continued)

*Primary Examiner* — Violeta A Prieto
(74) *Attorney, Agent, or Firm* — Gerhard W. Thielman

(57) ABSTRACT

A device is provided for rotation rate measurement. The device includes a laser, pre- and post-selection polarizers, a birefringent crystal, and a detector. The laser emits a photon beam. The crystal separates the beam into separate parallel beams by phase difference in response to the rotation rate as measured by the detector.

5 Claims, 6 Drawing Sheets

(56) References Cited

OTHER PUBLICATIONS

Y. Aharonov et al. "How the result of a measurement . . ." *Phys. Rev. Lett.* 60 (1351) 1988. https://journals.aps.org/prl/pdf/10.1103/PhysRevLett.60.1351.

I. M. Duck et al. "The sense in which a 'weak measurement' . . ." *Phys. Rev.* D 40 (2112) 1989. https://journals.aps.org/prd/pdf/10.1103/PhysRevD.40.2112.

A. G. Kofman et al. "Nonperturbative theory . . ." *Physics Reports* 520 (43) 2012. http://citeseerx.ist.psu.edu/viewdoc/citations;jsessionid=E83083B080B196C6C42D481004C09A0F?doi=10.1.1.310.1932.

J. Martinez-Rincón et al. "Ultrasensitive Inverse weak-value tilt meter" *Opt. Lett.* D 42 (13) 2479, 2017. https://www.osapublishing.org/ol/fulltext.cfm?url=ol-42-13-2479&id=368172.

F. Piacentini et al. "Investigating the Effects of the Interaction . . ." *Scientific Reports* 8 (6959) 2018. https://www.nature.com/articles/s41598-018-25156-7.pdf.

"Gaussian Beam Optics" http://experimentationlab.berkeley.edu/sites/default/files/MOT/Gaussian-Beam-Optics.pdf.

\* cited by examiner

QUANTUM WEAK-VALUE BIREFRINGENT CORIOLIS VIBRATORY GYROSCOPE

STATEMENT OF GOVERNMENT INTEREST

The invention described was made in the performance of official duties by one or more employees of the Department of the Navy, and thus, the invention herein may be manufactured, used or licensed by or for the Government of the United States of America for governmental purposes without the payment of any royalties thereon or therefor.

BACKGROUND

The invention relates generally to Coriolis vibratory gyroscopes. In particular, the invention relates to such gyroscopes that employ birefringent quantum weak values.

In principle, a Coriolis Vibratory Gyroscope (CVG) represents a compact device for measuring angular rotation of a platform. CVGs come in four general varieties: vibrating beams, forks, plates, and shells. Vibrating beam and vibrating fork gyros (also known as tuning fork gyros) are the most feasible candidates for implementing the particular quantum measurement scheme of interest.

SUMMARY

Conventional Coriolis vibratory gyroscopes yield disadvantages addressed by various exemplary embodiments of the present invention. In particular, various exemplary embodiments provide the ability to transduce the rotation of a system by quantum optical readout of the vibrations of a crystal, the vibrations of which are proportional to the rotation rate of the system. Exemplary embodiments provide a device for measurement of rotation rate. The device includes a laser, pre- and post-selection polarizers, a birefringent crystal, and a detector. The laser emits a photon beam. The preselection polarizer prepares the photon beam into a preselected quantum state. The crystal weakly separates the beam into separate parallel beams. The post-selection polarizer post-selects the beam, erasing the "which-path" information carried by the beam. The detector monitors the position of the beam and transduces the vibration of the crystal induced by the Coriolis effect.

BRIEF DESCRIPTION OF THE DRAWINGS

These and various other features and aspects of various exemplary embodiments will be readily understood with reference to the following detailed description taken in conjunction with the accompanying drawings, in which like or similar numbers are used throughout, and in which.

DETAILED DESCRIPTION

Figure 1:
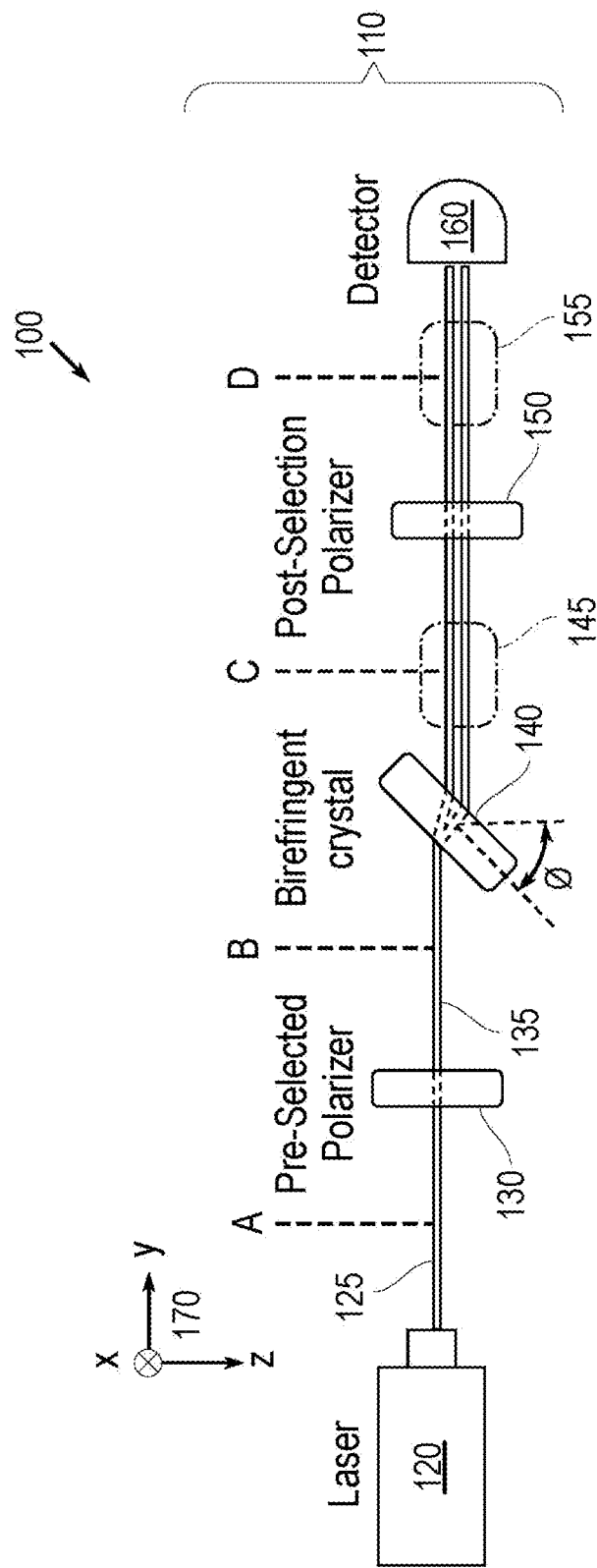
FIG. 1 is a diagram view of an optical detection architecture.

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

The disclosure generally employs quantity units with the following abbreviations: length in millimeters (mm), time in seconds (s) and angles in radians.

The purpose of exemplary embodiments is to improve upon the inertial measurement of rotation rate through the use of quantum optical measurement technique to readout the deflections of a birefringent crystal induced by the Coriolis effect. The exemplary concept is intended for hybrid quantum sensors that employ conventional gyroscope (gyro) technology and enhance its sensitivity through the application of an adjunct quantum-optical measurement technique.

CVGs contain a mechanical structure (be it a beam or a tuning fork) that is set to vibrate along an axis (i.e., a mode of vibration). When a rotational force is applied about an axis orthogonal to the vibrational mode, vibrational energy is transferred to the remaining orthogonal axis (i.e., the sense axis). A common architecture for this type of device is one in which the induced response is measured by reading out the angular deflection of the mechanical beam or tuning fork about the sense axis and calculating the rotational force that caused the deflection.

This force is most commonly measured by setting the beam as the cathode of a capacitor and measuring the change in capacitance induced by the vibrating component of the CVG as it deflects toward or away from a corresponding stationary anode. For a parallel plate-type capacitor, the capacitance C is:

$$C = \frac{\varepsilon_0 \cdot A}{g}, \qquad (1)$$

where g is the gap between cathode and anode, $\varepsilon_0$ is vacuum permittivity and A is area.

By shrinking this initial gap between cathode and anode, the change in capacitance can be measured more accurately. However, as the gap shrinks the allowable displacement also reduces, which ultimately limits sensitivity. Another problem with reducing the dimensions of the vibrating components is the inversely proportional relationship with measurement noise. As the vibrating structures get smaller, their susceptibility to thermo-mechanical noise increases, which raises the limit of detection (LOD) or minimum detection limit (MDL).

Using an optical read-out of the deflection eliminates the need to minimize the gap and instead the performance of an optical read-out scales in proportion to deflection sizes (i.e. larger deflections produce better resolution). Along with the increased measurement resolution, the noise associated with the vibrational components is inversely proportional to their size.

Optical read-out of CVG deflections are not new concepts, but reliable optical readout of the deflections in CVG still constitutes an active area of research. An October 2019 *Nature* article by Lavrik et al. "Optically read Coriolis vibratory gyroscope . . . " *Microsyst. & Nanoeng.* 5(47) detailed the research of a group at Oak Ridge National Laboratory (ORNL) that demonstrated the feasibility of obtaining navigation-grade performance from an optically-read CVG. The performance of the gyro by Lavrik (2019) was ultimately limited by the optical read-out method, suggesting that augmenting their CVG design with an improved optical read-out would improve the ultimate performance of the CVG.

The exemplary design configuration involves augmenting a CVG with a quantum-optical read-out technique using weak-value amplification (WVA) as provided by Y. Aharonov et al. "How the result of a measurement of a component of the spin . . . " *Phys. Rev. Lett.* 60(14) 1988. WVA is a quantum mechanical measurement technique that has been shown to amplify small signals, which are undetectable when traditional measurement methods are used. A canonical example of optical WVA architecture involves an ensemble of photons whose polarization states are weakly measured by a birefringent crystal. The exemplary configuration can be referred to as a canonical optical weak value amplification device (COWVAD).

The following parameters related to COWVADs are identified herein:

$a_e$ extraordinary spatial translation
$a_o$ ordinary spatial translation (obeys Snell's law)
$\hat{A}$ basis operator
$A_w$ weak value
k momentum boost parameter
$k_o$ vacuum wavenumber
n index of refraction of material
$\hat{p}$ momentum operator
P probability of post-selection
T birefringent crystal thickness
X drive amplitude
$\hat{U}$ unitary operator
z position
$\hat{z}$ position operator
$\langle z \rangle$ position expectation value
$\beta$ post-selection angle
$\gamma$ interaction strength (or relative position translation)
$\gamma_o$ polarization independent position translation
$\varepsilon$ angle of deviation between pre- and post-selected polarization states (or post-selection angle)
$\lambda$ laser wavelength
$\theta$ angle of incidence
$\theta_{CP}$ coherency point
$\sigma$ beam radius
$\phi$ phase-shift
$|\Phi_i\rangle$ initial pointer state
$|\Phi_f|^2$ photon probability density
$\psi_i$ preselection state
$\psi_f$ post-selection state
$\Omega$ rotation rate
$\omega$ drive frequency The exemplary weak amplification COWVAD architecture: FIG. 1 shows a diagram view 100 of a laser beam-splitting architecture 110. The configuration in view 100 illustrates the basic components of the exemplary architecture 110 including a laser 120 that emits an emission beam 125, a preselection polarizer 130 that transmits a polarized beam 135, a canted birefringent crystal 140 with optical axis oriented along the x-axis, yielding a pair of split parallel beams of orthogonal, linear polarizations 145, a post-selection polarizer 150 with its polarized beams 155, and an optical detector 160. The beam 135 strikes the crystal 140 at an angle of incidence 8 from normal.

The architecture 110 is disposed in the y-z plane shown by a compass rose 170 featuring Cartesian coordinates, with the beams 125, 135, 145 and 155 traveling along the y-axis, the x-axis into the plane and the z-axis down (towards starboard of the beams). Points "A", "B", "C" and "D" denote positions along the architecture 110. Point "A" is disposed between the laser 120 and the polarizer 130. Point "B" is disposed between the polarizer 130 and the crystal 140. Point "C" is disposed between the crystal 140 and the polarizer 150. Point "D" is disposed between the polarizer 150 and the detector 160.

At point "A", the laser beam 125 propagating along the y-axis has arbitrary polarization and an approximately Gaussian intensity profile. At point "B" the beam 135 has passed through the first linear polarizer 130, preselecting the beam into an equal superposition of horizontal (z-axis) and vertical (x-axis) polarization states. At point "C", the birefringent crystal 140 has weakly interacted with the beam 135, spatially translating each polarization component of the resulting beams 145 by a slightly different amount via refraction. The pair of translated beams 145 are largely overlapping so that both are spatially indistinguishable. At point "D", the beams 155 have been post-selected by the second polarizer 150 into a polarization state that is nearly orthogonal to the preselected state.

This prescription results in the observation of a spatial translation (called the "pointer") of the Gaussian beam profile that is much larger than expected from refraction, provided key conditions are satisfied. Gaussian Beam Optics at http://experimentationlab.berkeley.edu/sites/default/files/MOT/GaussiunBeatn-Optics.pdf describes the profile. First, the spatial separation between the two beams 145 must be very small. Quantitative description of this distance is described subsequently.

Second, the incidence angle θ between the face of the crystal 140 and the incident laser beam 135 must be such that the two beams 145 emerge in-phase with one another. Note that the "pointer" represents the spatial translation on the face of the detector 160. The position of the Gaussian is defined by the expectation value of along the z-axis. This expectation value is the pointer and it translates in response to a change in incidence angle θ, which changes in response to a rotation rate applied to the architecture 110.

Depending on the thickness T of the crystal 140 and the wavelength 2 of the laser 120, there are generally multiple incidence angles where this occurs; these angles are called coherency points Beginning at a coherency point, when incidence angle θ changes slightly in either direction, the weakness conditions break down. This causes a large spatial translation to be observed on the face of the detector 160. This condition represents the Gaussian snapping back to the unamplified position. The exemplary architecture 110 aims to exploit this large spatial translation that occurs due to the breakdown of the weakness conditions caused by a change in incidence angle θ.

Although the behavior of the COWVAD's pointer at coherency points is well understood, its behavior in the transition region between where WVA does and does not occur, i.e., small angular deviations around coherency points has not been explored previously. Experimental observations indicate that, in this region, the pointer rapidly shifts from its amplified to its unamplified position in a manner that is highly sensitive to incidence angle θ. This previously unreported behavior implies the utility of the COWVAD as the tilt sensitive component in a practical sensor.

Physical Effects of the birefringent crystal and incidence angle dependence: The central feature of the COWVAD is a uniaxial, birefringent crystal oriented with its optic axis perpendicular to the plane of incidence. In this orientation, the crystal has two important effects on the laser beam. First, it acts as a type of polarizing beam-splitter. Light refracting through the crystal 140 follows Snell's Law, but with different indices of refraction depending on polarization. The incident beam 125 is prepared in a state of linear polarization oriented π/4 radians from the optic axis (x-direction) of the crystal 140.

In this state, the laser beam 135 is split evenly along two possible paths 145, one corresponding to "vertical" polarization (parallel to the crystal's optic axis) and the other corresponding to "horizontal" polarization. The beams 145 exit the crystal 140 propagating along paths parallel to the incident beam 135 but having been spatially translated along the z-axis. The separation distance between the beams 145 is greatly exaggerated in view 100, as the beams must be spatially unresolvable. The optic axis of the crystal 140 is oriented out of the plane, perpendicular to the plane of incidence.

Figure 2:
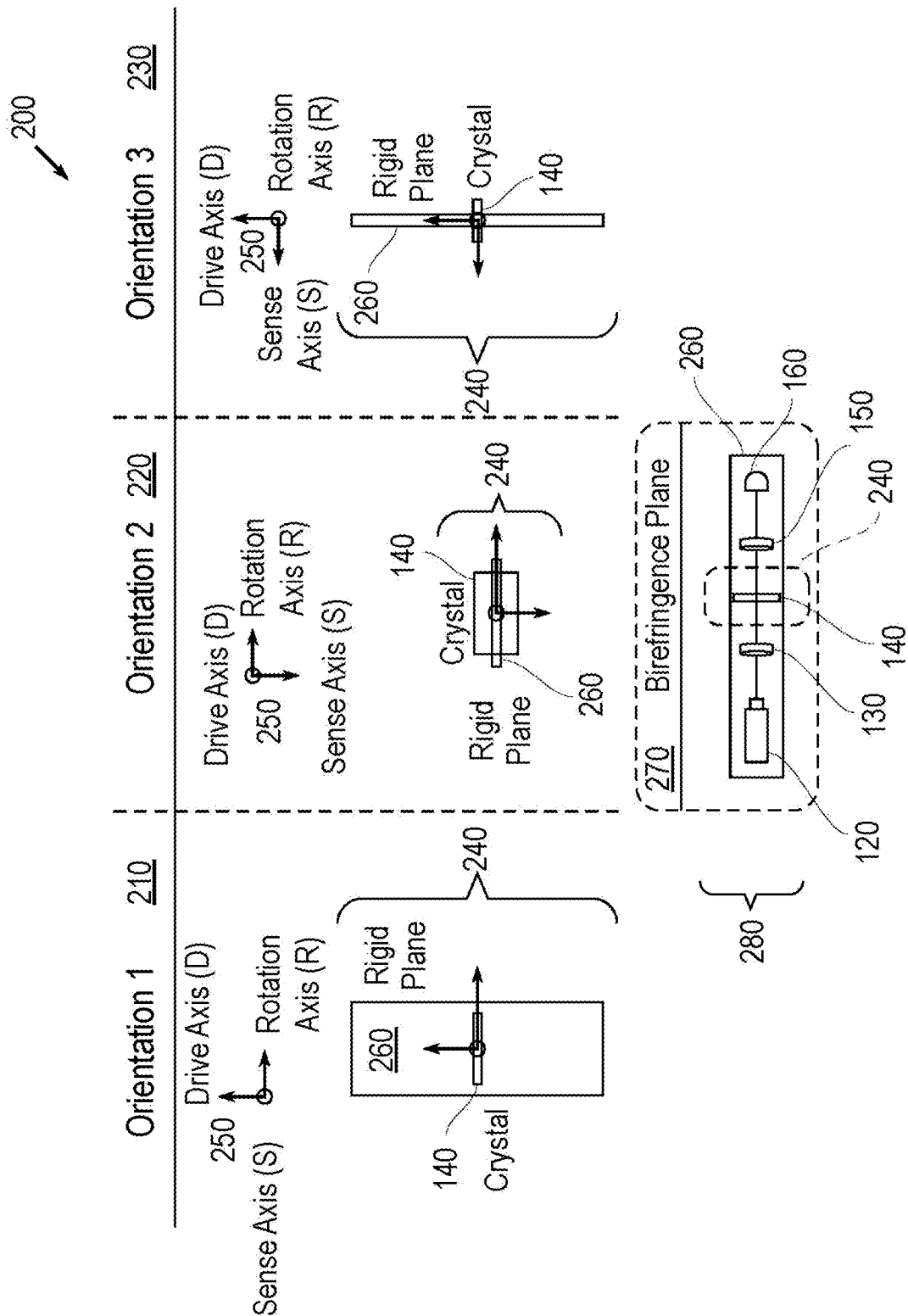
FIG. 2 is a diagram view of crystal mount orientation.

FIG. 2 shows a diagram view 200 in three orientations 210, 220 and 230 of an exemplary amplifier 240. A compass rose 250 illustrates a drive axis D, a rotation axis R and a sense axis S with orientation 210 in the R-D plane, orientation 220 in the S-R plane and orientation 230 in the D-S plane. A rigid platform 260 serves for mounting components. A birefringent crystal 140 is disposed on the platform 260 oriented to face the D-axis. The optical components are omitted in view 200 for simplification. Correlation between compass roses 170 and 250 can be identified as follows: S (sense), D (drive) and R (rotation) axes in view 200 correspond respectively to x, y and z axes of the compass rose 170 in view 100.

The amplifier 240 operates by driving the birefringent crystal 140 to oscillate at a set frequency co and amplitude X along or about the drive or D axis. In its birefringent plane (BP) 270, an exemplary assembled device 280 of the amplifier 240 with associated optical components is also illustrated in the first orientation 210 as the BP 270.

When the exemplary device 280 is rotated at an angular rate of Q about an axis orthogonal to D, called the rotation or R axis, a vibration is induced in the third remaining orthogonal axis, i.e., the sensing or S axis. The amplitude Δθ of the induced oscillation is proportional to the drive signal parameters and the rotation rate about the R axis, expressed as: $\Delta\theta \propto \Omega \omega X$. Thus, rotation rate Ω can be determined from measurement of amplitude Δθ. The laser 120 shines an optical beam 125 to the first polarizer 130, the crystal 140, the second polarizer 150 and into the detector 160. The laser 120, polarizers 130 and 150, detector 160 and crystal 140 are mounted to the rigid platform 260.

The system as a whole architecture 110 can be made miniscule because the exemplary embodiments need only five components. For light emitted from the laser 120 being linearly polarized enables the first linear polarizer 130 to be omitted. This item is included in view 100 to facilitate initial understanding. The birefringent crystal 140 can be composed of various solid optically transparent materials, although in the embodiments described herein the uniaxial mineral crystal quartz (silicon dioxide $SiO_2$, as distinct from amorphous fused silica) has been selected.

Thus, upon recognition of this concept, the first polarization can be accommodated by a linearly polarized laser combining the function of the laser 120 and the polarizer 130. Tiny lasers known as the vertical-cavity surface-emitting laser 120 (on the order of a couple microns in size) can be combined with millimeter-sized polarizers 130 and 150, crystal 140, and optical image sensor as detector 160 to form a package architecture 110 on the order of a couple cubic millimeters.

The role of the WVA is to amplify the measurement of oscillation amplitude Δθ, thus increasing the sensitivity of the amplifier 240 to the rotation rate Ω. Traditionally WVA theory requires the crystal's incidence angle θ to be initialized to a coherency point $\theta_{CP}$, and the polarization angles of the pre- and post-selection polarizers 130 and 150 to be chosen appropriately.

By contrast in the exemplary configuration, a Coriolis-effect-induced oscillation of angle change Δθ about $\theta_{CP}$ results in an oscillating spatial translation of a pointer (i.e., spatial translation), amplified by WVA. In this instance, the pointer corresponds to the transverse coordinates of the R-axis.

The various components associated with the WVA read-out are mounted on a rigid platform 260 exemplified by the BP 270. The crystal 140 must be free to oscillate independently of the BP 270 about D and S, but any rotation of the crystal 140 about R must occur in unison with all other components rigidly mounted to the BP 270 that serves as the platform 260. Conveniently, the COWVAD architecture 110 has relatively minimal components and balancing requirements, and therefore lends itself well to physical compactness.

Figure 3:
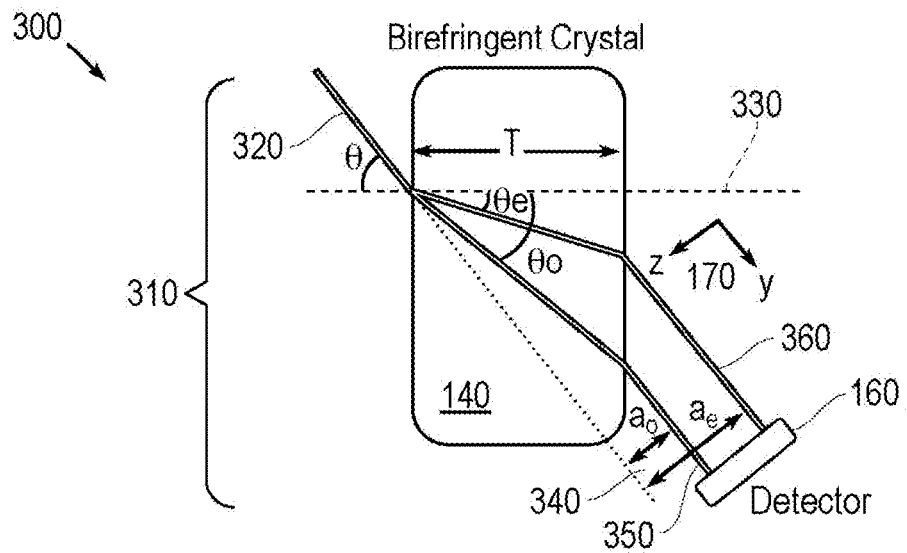
FIG. 3 is a diagram view of a birefringent crystal.

FIG. 3 shows a diagram view 300 of the birefringent crystal 140 and its associated detector 160 highlighting details as an optical assembly 310. An incident ray 320 (analogous to the beam 135) strikes the crystal 140 at an incidence angle θ from normal 330 to its incident plane along photon path 340 along the y-axis in compass rose 170. The crystal 140 divides the incident ray 320 into an ordinary ray 350 and an extraordinary ray 360. The ordinary ray 350 is horizontally polarized, meaning amplitude varies within the y-z plane. By contrast, the extraordinary ray 360 is vertically polarized, meaning amplitude varies in the x-y plane.

The crystal 140 has different indices of refraction than the surrounding air, and thereby refracts both rays by angles that deflect from the incidence angle θ. The ordinary ray 350 has an angular offset from normal 330 of $\theta_o$, which is less than incidence angle θ. The extraordinary ray 360 has an angular offset of $\theta_e$, which for a positive crystal (such as quartz) is less than $\theta_o$. Across the thickness T of the crystal 140, this produces a spatial separation. Upon exiting the crystal both rays 350 and 360 travel parallel to the detector 160 offset by the difference between their respective ordinary and extraordinary spatial translations $a_o$ and $a_e$ from the path 340.

The magnitudes of the spatial translations $a_o$ for the ordinary (horizontally polarized) ray and $a_e$ for the extraordinary (vertically polarized ray), are dependent on the incidence angle θ between the laser beam and the crystal face. This angle θ dependence of translations $a_o$ and $a_e$ is provided by:

$$a_{o,e} = T \sin\theta \left( \frac{n_{air} \cos\theta}{\sqrt{n_{a,e}^2 - (n_{air} \sin\theta)^2}} - 1 \right), \quad (2)$$

where T is the thickness of the crystal 140, and $n_o$, $n_e$ and $n_{air}$ are the indices of refraction for the ordinary beam 350, extraordinary beam 360, and air, respectively. Air has an index of refraction $n_{air}$ of 1.0003. For quartz, the ordinary index $n_o$ is 1.544 and the extraordinary index $n_e$ is 1.553 for the visible yellow-orange wavelength (λ~590 nm).

The theory associated with optical readout of crystal oscillations can aid in understanding the utility of this amplifier 240 for augmenting the measured oscillations as signals as a component of the exemplary device 280. The relative phase-shift ϕ can be determined from traditional optics and geometry so these are not derived here, but nonetheless result in the following relation:

$$\phi = Tk_o(\sqrt{n_e^2-(n_{air}\sin\theta)^2} - \sqrt{n_o^2-(n_{air}\sin\theta)^2}), \quad (3)$$

where $k_o$ is the vacuum wavenumber of the laser 120. This expression for eqn. (3) is a necessary component of the final pointer state.

Figure 4:
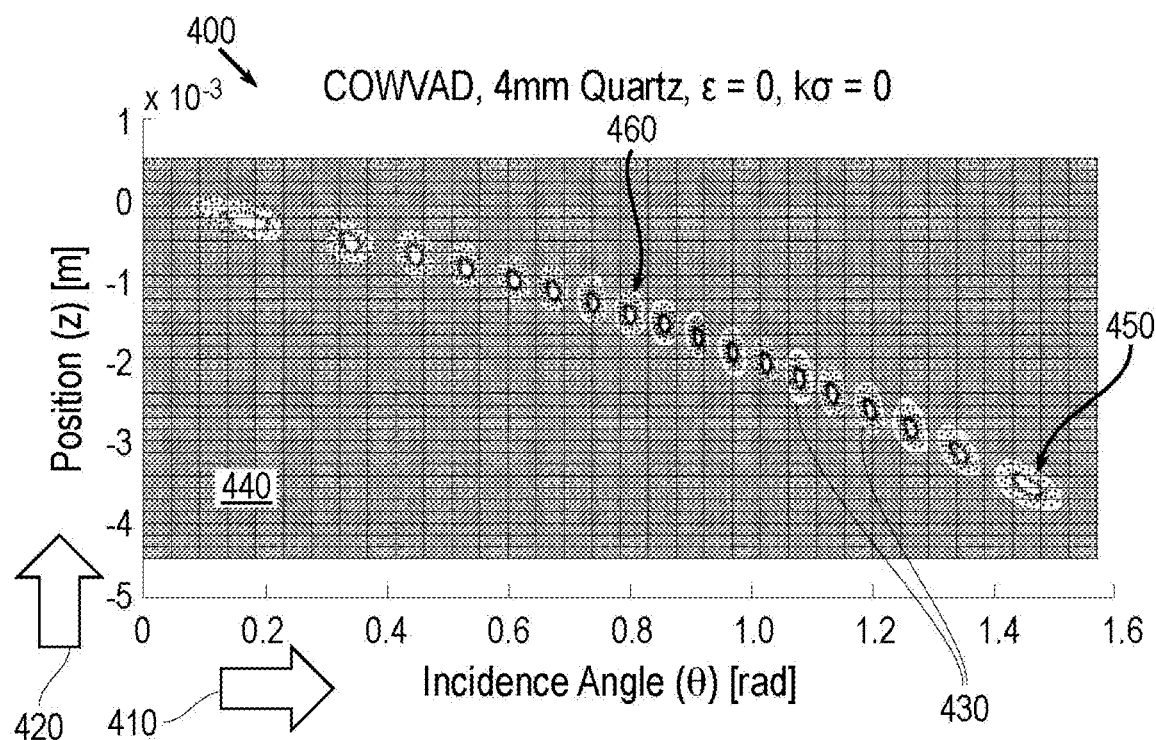
FIG. 4 is a graphical view of coherence patterns.

FIG. 4 shows a graphical view 400 of position and intensity variation with incidence angle for a crystal 140 composed of quartz having a thickness T of 4 mm, with both post-selector deviation ε and weak momentum boost kσ of zero as:

$$\varepsilon = k\sigma = 0, \quad (4)$$

for this crossed polarizers example. Incidence angle θ 410 (radians) denotes the abscissa, while position z 420 (millimeters) denotes the ordinate. An arc of alternating light and dark regions 430 separated at varying intervals demonstrate the dependence of laser beam position and intensity on incidence angle. The dark spots represent coherency points; incidence angles where the beams are in phase and beam intensity is at a local minimum. Over the full range of incidence angles, the relative phase-shift ϕ generally rotates through multiple complete cycles, the number of which increases in proportion to crystal thickness T.

Figure 5:
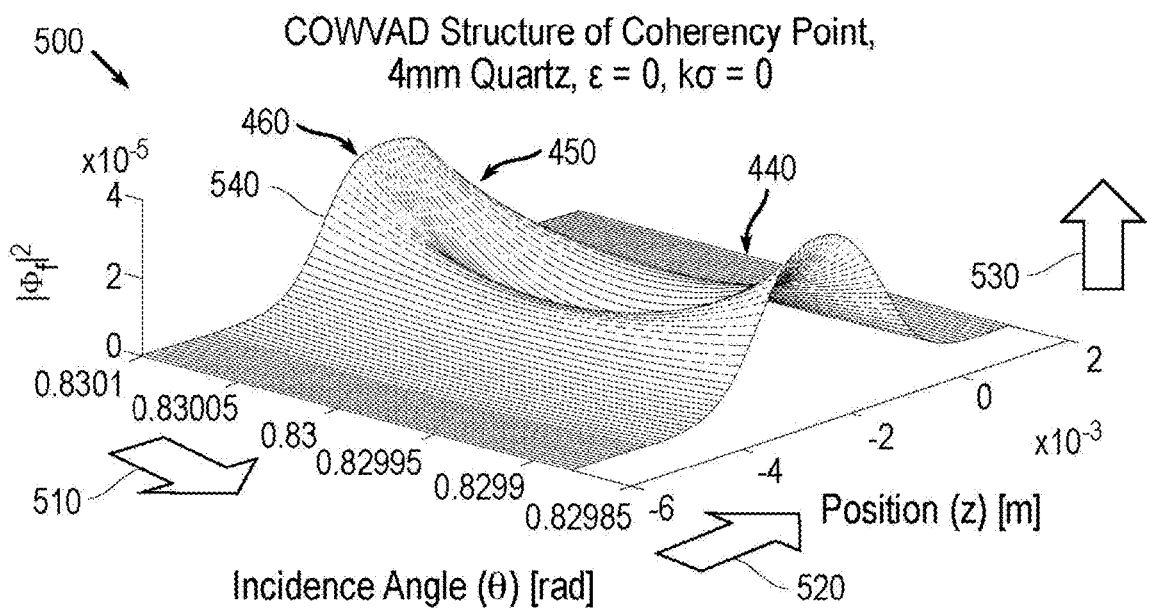
FIG. 5 is a contour view of coherency point topography.

Probability of Post-Selection: After post-selection, the photon probability density $|\Phi_f|^2$ (and therefore the beam intensity) is dependent on incidence angle θ. At coherency points, the probability density is heavily attenuated. The downward trend along the z-axis in view 400 demonstrates the θ-dependence of polarization-independent translation $\gamma_o$, which is the unamplified position expectation value of the Gaussian beam and subsequently expressed in eqn. (20). The dark, vertical separation bands between the highlighted regions 430 are the highly attenuated coherency points where phase-shift ϕ approaches integer multiples of 2π radians. The probability that a photon will survive post-selection is given by the magnitude of the post-unitary state projected onto the post-selected state, which is simply the normalization factor of the final state wave function:

Graphical Results: The following plots further illustrate post-selection effects. FIG. 5 shows a detail contour topology view 500 of post-selection photon probability density $|\Phi_f|^2$ structure near the eighth coherency point. This is quantified with quartz of 4 mm thickness, with both deviation s and weak momentum boost kσ of zero as in eqn. (4) with pre- and post-selection states orthogonal (crossed polarizers). Incidence angle θ 510 (radians) denotes a first abscissa, position z 520 (millimeters) denotes a second abscissa, and post-selection probability 530 (in ten-thousandths) denotes the ordinate. The variation is shown as a continuous undulating sheet 540 with relative maximums at specific intervals of incidence angle. Coherency points are incidence angles for which the relative phase-shift is effectively zero, as denoted by:

$$\cos\phi = 1. \quad (5a)$$

The interesting behavior lies in the structure of the photon probability density $|\Phi_f|^2$ in view 500 at and near the coherency points. There, perfectly crossed pre- and post-selection polarizers produce a symmetric, dual-mode Gaussian distribution along the spatial axis. Two alternative conditions to break symmetry include:

$$\gamma|\sigma \ll \varepsilon \ll 1, \quad (5b)$$

where γ is relative translation and a is beam radius, or else a momentum kick such that:

$$\varepsilon \ll k\sigma \ll 1, \quad (5c)$$

breaks the symmetry causing the position expectation value $\langle z \rangle$ to demonstrate WVA or inverse-WVA characteristics, respectively.

Figure 6:
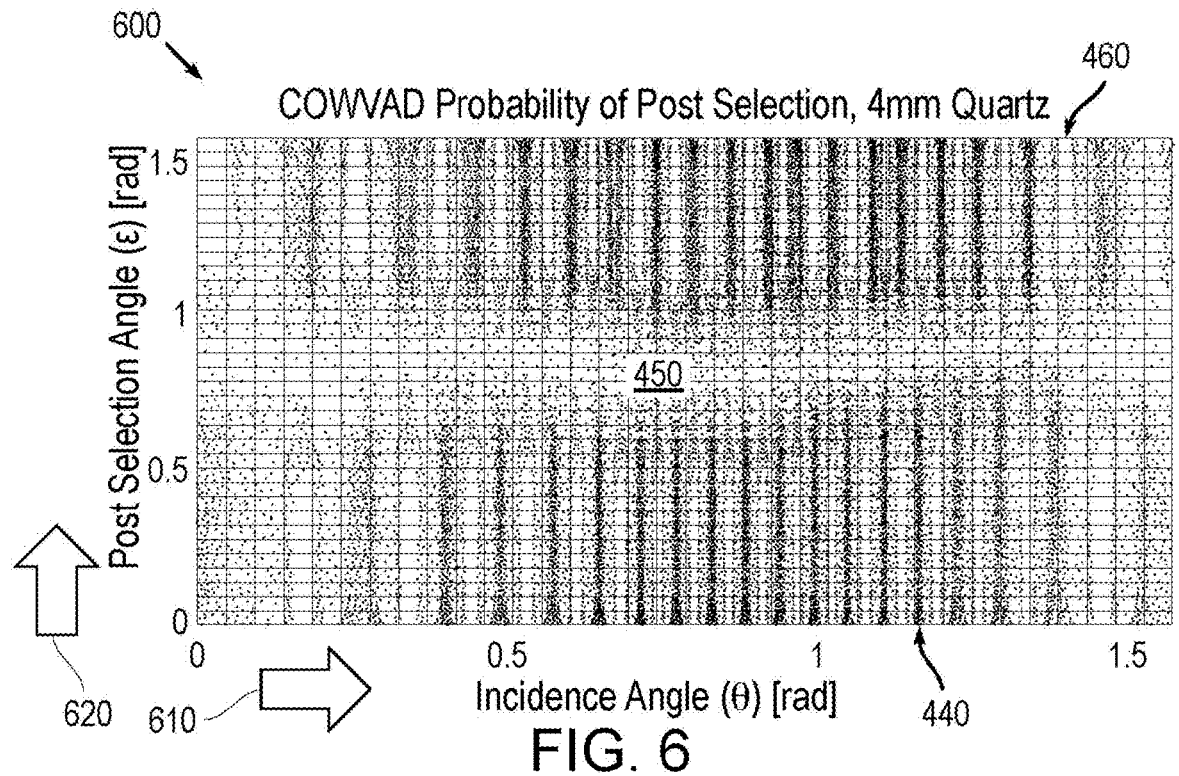
FIG. 6 is a graphical view of the dependence of coherence on post-selection and incidence angle.

FIG. 6 shows a graphical view 600 of post-selection probability response to incidence angle θ 610 (radians), which denotes the abscissa, and post-selection angle ε 620 (radians), denotes the ordinate. The plot shows bands of high and low values of post-selection probability. Along the bottom of view 600 such that:

$$\varepsilon \ll 1, \quad (6a)$$

the separation bands represent the coherency points where the paths are approximately in phase and WVA occurs. Interestingly, WVA also occurs at another set of incidence angles, which produce vertical separation bands along the top of view 600 where:

$$\varepsilon \approx \pi/2, \quad (6b)$$

in which pre- and post-selected states nearly parallel at θ-values for which the two photon paths are nearly out-of-phase, such that:

$$\cos\phi \approx -1. \quad (6c)$$

Classically, this can be understood by the fact that phase-shift ϕ describes the generally elliptical polarization state of the light exiting the crystal 140. When the overlapping beams 145 are perfectly in phase, photons leaving the crystal 140 have the same polarization as photons entering the crystal 140. However, when the overlapping beams are perfectly out-of-phase, the crystal 140 has rotated the polarization state of the photons such that the exiting photons are polarized perpendicular to those entering the crystal 140. Therefore, a post-selector 150 nearly aligned with the pre-selector 130 will select a polarization nearly orthogonal to that exiting the crystal 140.

As suggested in view 600, the weak value is defined for this alternate set of incidence angles when the pre- and post-selection polarizers 130 and 150 are nearly aligned. At these incidence angles, the phase-shift ϕ produced in the crystal 140 results in a π/2 radians rotation of the polarization of the beam exiting the crystal 140. The final state $|\psi_f\rangle$ of the system then takes the form:

$$|\psi_f\rangle = \cos\beta|H\rangle - \sin\beta|V\rangle, \quad (7)$$

which produces weak values:

$$\frac{\langle\psi_f|\hat{A}|\psi_i\rangle}{\langle\psi_f|\psi_i\rangle} = -\cot\varepsilon, \quad (8)$$

where the substitution of the post-selection angle is:

$$\beta = \varepsilon + \frac{\pi}{4}, \quad (9)$$

and ε is some small angle deviation from alignment between the pre- and post-selection polarizers 130 and 150.

This is further verified by the position expectation value ⟨z⟩ at the detector 160 expressed as:

$$\langle z \rangle = \gamma_o - \frac{\gamma \sin 2\varepsilon + k \sigma^2 \cos 2\varepsilon \cdot \sin \phi \cdot \exp\left(-\frac{(k\sigma)^2 + (\gamma/\sigma)^2}{2}\right)}{1 + \cos 2\varepsilon \cdot \cos \phi \cdot \exp\left(-\frac{(k\sigma)^2 + (\gamma/\sigma)^2}{2}\right)} \approx \quad (10)$$

$$\gamma_o - \gamma \cot \varepsilon,$$

where the approximation on the right is valid when:

$$k\sigma = 0, \quad (11a)$$

$$\cos\phi \approx 1, \quad (11b)$$

and $$e^{-\gamma^2/2\sigma^2} \equiv \exp\left(\frac{-\gamma^2}{2\sigma^2}\right) \approx 1. \quad (11c)$$

When the weak-value conditions in eqn. (5b) are not satisfied, the validity of weak-value theory breaks down. The exact structure of this breakdown, specifically with respect to the incidence angle θ of the birefringent crystal 140, is a primary discovery leading to the exemplary embodiments. First consider the behavior at coherency points when the weak-value conditions in eqn. (5b) are violated. These conditions put rough upper and lower bounds on the post-selection angle ε. Because the spatial translation γ (as a measure of interaction strength) is a function of incidence angle θ, the rough lower bound of E is specifically determined at each coherency point. This also imposes an upper bound on the WVA that can be achieved as, $$A_w = \cot \varepsilon \ll \cot\left(\frac{\gamma}{\sigma}\right). \quad (12)$$

When the weak-value conditions for g are satisfied, the resulting beam profile is a single-mode Gaussian. In this regime, the position expectation value ⟨z⟩ is nearly identical to the peak of the Gaussian. For very small s values as:

$$\varepsilon < \sim \gamma/\sigma. \quad (13a)$$

A secondary mode emerges in the beam profile, growing in magnitude until a symmetric dual-mode distribution occurs at:

$$\varepsilon = 0. \quad (13b)$$

As the magnitude of the second mode approaches that of the first, expectation value ⟨z⟩ decouples from the weak-value predictions.

Although not well approximated by weak-value theory, the largest shift in position expectation occurs when:

$$\varepsilon = \frac{\gamma}{2\sigma}. \quad (13c)$$

One can observe that for small post-selection angles as:

$$\varepsilon \ll \frac{\gamma}{2\sigma}, \quad (13d)$$

the COWVAD device 110 enters the inverse-WVA regime, becoming sensitive to small changes in ε, indicated by the steep slopes near the y-axis. For larger values of angle ε, the amplification diminishes and ⟨z⟩ approaches independent spatial translation $\gamma_o$ as angle ε approaches π/4.

Figure 7A:
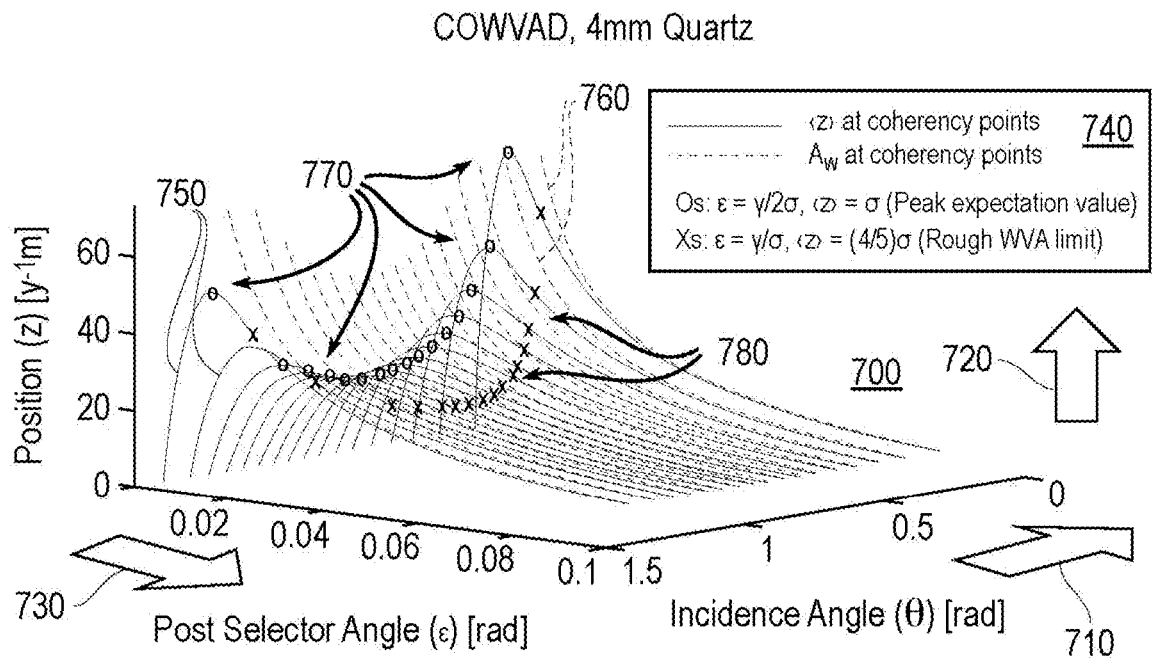
FIGS. 7A and 7B are graphical views of pointer response to post-selection at each coherency point.
Figure 7B:
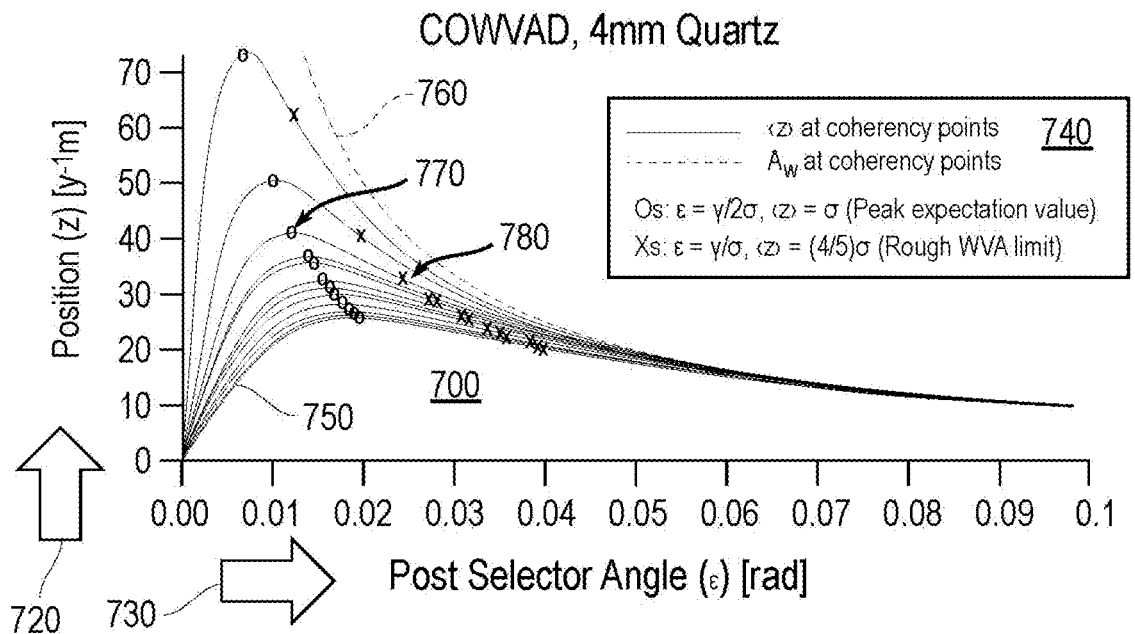

FIGS. 7A and 7B show respective contour and graphical views 700 of position response to angular variation to illustrate these effects. FIG. 7A depicts incidence angle θ 710 (radians) as the first abscissa and post-selection angle ε 720 (radians) as the second abscissa. Both graphs feature position 730 (radians) as the ordinate. A legend 740 identifies solid (blue) lines 750 as expectation ⟨z⟩ at coherency points, dash (green) lines 760 as the weak value A at coherency points, hollow circles (c) 770 as peak expectation value where expectation ⟨z⟩ =σ equals beam radius when angle ε=γ/2σ, and tilted crosses (x) 780 as the approximate WVA limit where expectation ⟨z⟩ =(4/5)σ when angle ε=γ/σ.

Views 700 show the same three-dimensional plot from isometric and planar perspectives. The position expectation ⟨z⟩ of the coherency points (solid lines 750) is well approximated by weak-value theory (dash lines 760) when the weak value conditions under eqn. (5b) are satisfied. Note that at:

$$\varepsilon = \sigma/4, \quad (13e)$$

(not shown), the solid and dash curves 750 and 760 cross unity, meaning:

$$\langle z \rangle = \gamma, \quad (13f)$$

and so no weak-value amplification occurs for expectancy equaling translation.

Figure 8:
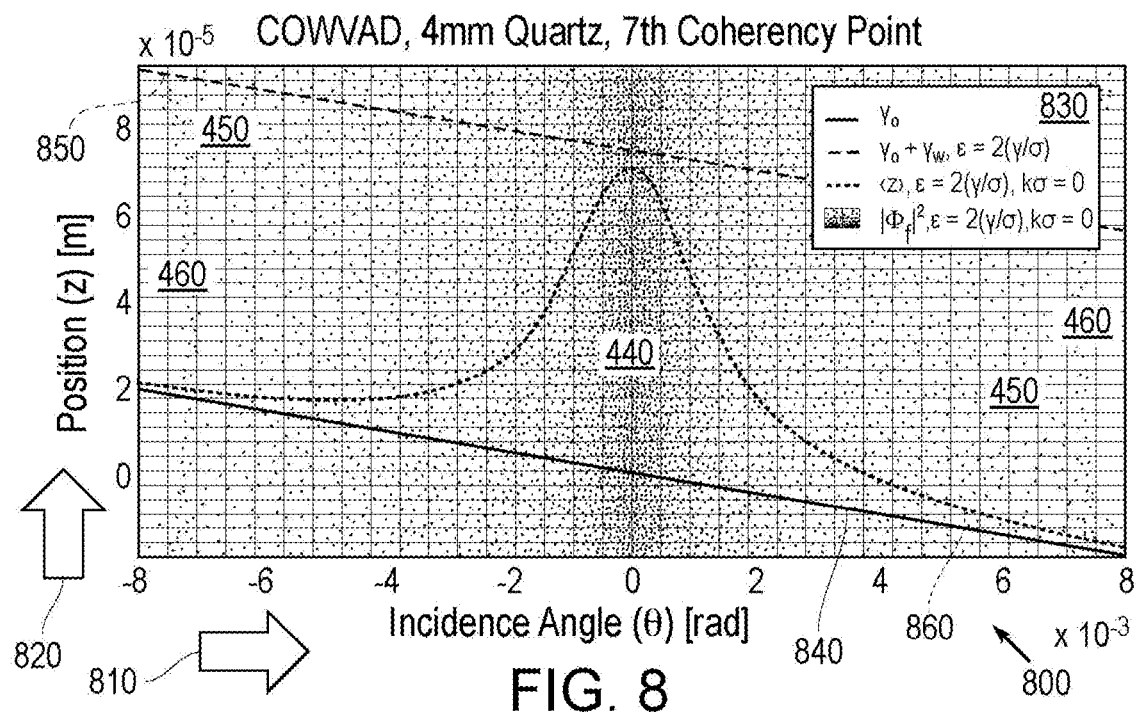
FIG. 8 is a graphical view of weak-value amplification of the pointer position around a coherency point.

FIG. 8 shows a graphical view 800 of position expectation response at the seventh coherency point. Similar to view 400, incidence angle θ 410 (radians) denotes the abscissa, while position z 420 (millimeters) denotes the ordinate. A legend 830 identifies lines for translation $\gamma_o$ 840, $\gamma_o + \gamma A_w$ 850 and ⟨z⟩ 860. Near the coherency point, the position expectation 860 deviates away from $\gamma_o$ 840 and approaches the WVA prediction value 850. The beam's intensity is weakest at the coherency points and strongest midway between them.

Next, consider how amplification breaks down at a fixed angle deviation ε due to the deviation of incidence angle θ away from a coherency point. The photon probability distribution depends on θ as observable in FIGS. 4, 5, 6 and 8 (i.e., views 400, 500, 600 and 800). Therefore, deviations in θ produce large intensity changes.

In the case of zero momentum boost, as incidence angle θ (and therefore phase-shift ϕ) deviates from the coherency point, expectation ⟨z⟩ rapidly shifts from combined translation $\gamma_o + \gamma A_w$ as the value predicted by weak-value theory, to the more intuitive, classical value of $\gamma_o$, as shown in view 800. The slope of the pointer shift, i.e., the sensitivity of ⟨z⟩ to incidence angle θ, is determined mainly by γ, ε, and σ (which control the magnitude of the shift), the thickness T of the crystal 140, and wavenumber of the photon $k_o$ (which determines the width of the shift with respect to incidence angle θ).

Figure 9:
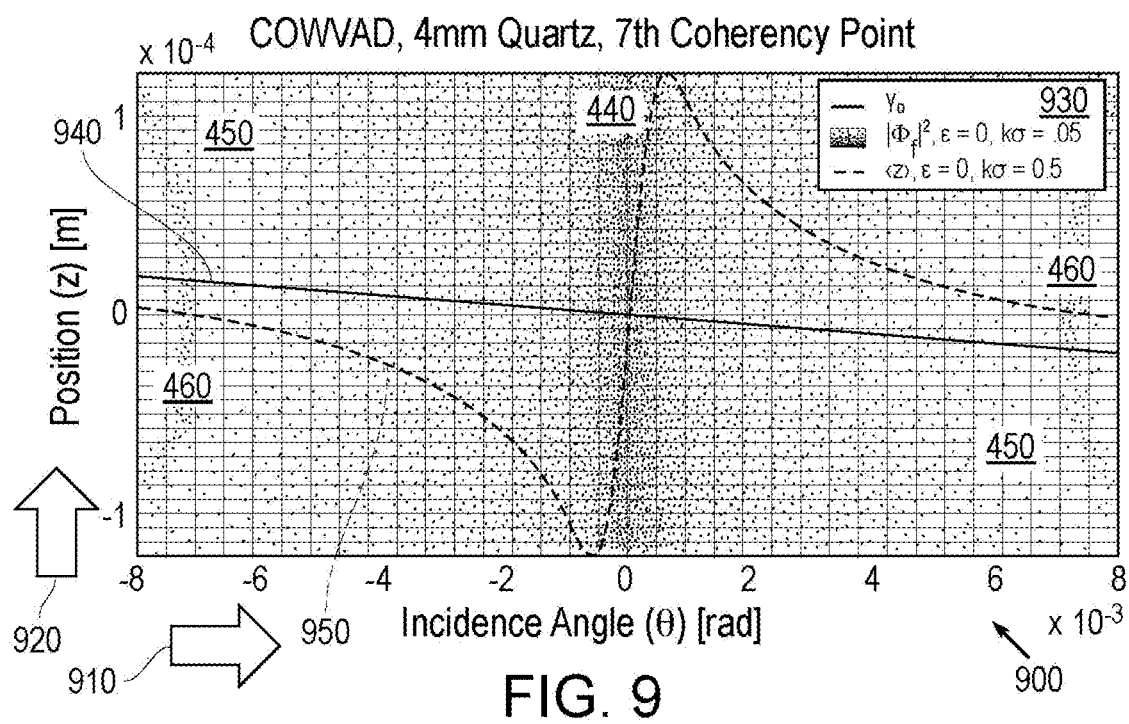
FIG. 9 is a graphical view of inverse weak-value amplification of the pointer position around a coherency point.

FIG. 9 shows a graphical view 900 of position expectation response near the seventh coherency point in an inverse WVA regime, where:

$$k\sigma > 0, \tag{14a}$$

$$\text{and } \varepsilon \ll k\sigma. \tag{14b}$$

Similar to view 400, incidence angle θ 910 (milli-radians) denotes the abscissa, while position z 920 (millimeters) denotes the ordinate. A legend 930 identifies lines for translation $\gamma_o$ 940, translation $\gamma_o + \gamma A_w$ 950 and expectation ⟨z⟩ 960. Photon probability density (i.e., intensity) is higher at incidence angles 8 towards the extremes at ±8 radians, and lowest at zero (the coherency point). In this example, the expectation response 960 is anti-symmetric, crossing $\gamma_o$ at the coherency point.

Momentum Boost: The pure inverse WVA regime is defined by:

$$\gamma = 0, \tag{14c}$$

$$\text{and } \varepsilon = 0, \tag{14d}$$

$$\text{where } \phi \ll k\sigma \ll 1. \tag{14e}$$

Both regimes demonstrate high sensitivity to incidence angle θ, but the inverse WVA regime presents a more practical engineering arrangement. Note that for a birefringent crystal 140, translation γ is approximately zero only at:

$$\theta = 0. \tag{14f}$$

Quantum Description and the effect of Post Selection: For this WVA architecture amplifier 240, an ensemble of photons as incident ray 320 is refracted through the birefringent crystal 140, entangling the polarization states (qubit) and the transverse pointer of each photon. The ensemble is preselected via the polarizer 130 into an equal superposition of orthogonal polarization states such that the initial state of the qubit takes the form:

$$|\psi_i\rangle = \frac{1}{\sqrt{2}}(|H\rangle + |V\rangle), \tag{15}$$

where |H⟩ and |V⟩ are the respective horizontal and vertical polarization basis states. These correspond to the ordinary and extraordinary rays 350 and 360, respectively.

The initial pointer state |Φ$_i$⟩ has a distribution that is approximately Gaussian, thus takes the form:

$$|\Phi_i\rangle = \int_{-\infty}^{\infty} dz \langle z | \Phi_i \rangle |z\rangle; \quad \langle z | \Phi_i \rangle = \frac{e^{-\frac{z^2}{4\sigma^2}}}{\sqrt[4]{2\pi\sigma^2}} \equiv \frac{\exp\left(\frac{z^2}{4\sigma^2}\right)}{(2\pi\sigma^2)^{1/4}}, \tag{16}$$

where 2σ is the $e^{-2}$ radius of the photon beam and z is the direction perpendicular to photon propagation and parallel to the horizontal, as shown in view 100. The combined state of the qubit and pointer is convolution |ψ$_i$⟩ ⊗ |Φi⟩.

As was performed by I. M. Duck et al. "The sense . . . " Phys. Rev. D 1989, the crystal interaction is modeled as a relative spatial translation ±γ between the horizontal |H⟩ and vertical |V⟩ paths respectively corresponding to rays 350 and 360. In order to capture the full θ dependence, one accounts for the polarization-independent spatial translation $\gamma_o$ of the photons relative to the initial photon path 340, as well as the relative phase-shift φ between the two rays 350 and 360. In addition, if the optic axis of the crystal 140 is not perfectly aligned with the D-axis, the photon paths 155 exiting the crystal 140 will not be parallel. This is modeled by a relative momentum boost of strength k.

Together these effects are modeled by the unitary operator:

$$\hat{U} = \exp\left[\left(-\frac{2\pi i}{h}\right) \cdot (\gamma_o + \gamma \otimes \hat{A})\hat{p}\right] \cdot \exp\left(\frac{2\pi i}{h}\frac{k}{2}\hat{z} \otimes \hat{A}\right) \cdot \exp\left(-i\frac{\phi}{2}\hat{A}\right), \tag{17}$$

where polarization basis operator $\hat{A}$ is $\hat{A} = |H\rangle\langle H| - |V\rangle\langle V|$, $\hat{p}$ is the momentum operator operating on the initial pointer state |Φ$_i$⟩, and $\hat{z}$ is the position operator operating on |Φ$_i$⟩. Standard values include h=2πℏ as the Planck constant, and i as the imaginary number (i=√−1).

The spatial translation magnitudes of the |H⟩ and |V⟩ paths in eqns. (7), (15) and (17) are related to the interaction strength variables by:

$$a_o = \gamma_o - \gamma, \tag{18}$$

$$\text{and } a_e = \gamma_o + \gamma. \tag{19}$$

The polarization-independent spatial translation $\gamma_o$ and the relative spatial translation γ can be expressed as a function of crystal thickness T, incidence angle θ and the relevant indices of refraction $n_o$, $n_e$, and $n_{air}$ as:

$$\gamma_o = \frac{T}{2}\cos\theta \cdot n_{air} \cdot \sin\theta \cdot \left(\frac{1}{\sqrt{n_o^2 - (n_{air}\sin\theta)^2}} + \frac{1}{\sqrt{n_e^2 - (n_{air}\sin\theta)^2}} - 2\right), \tag{20}$$

$$\text{and } \gamma = \frac{T}{2}\cos\theta \cdot n_{air} \cdot \sin\theta \cdot \left(\frac{1}{\sqrt{n_o^2 - (n_{air}\sin\theta)^2}} - \frac{1}{\sqrt{n_e^2 - (n_{air}\sin\theta)^2}}\right). \tag{21}$$

After interaction with the crystal 140, the photon is post-selected via projection onto a final state that is nearly orthogonal to the initial preselected state:

$$|\psi_f\rangle = \cos\beta|H\rangle + \sin\beta|V\rangle, \tag{22}$$

where β is the post-selection angle.

Combining eqn. (15) with eqns. (16), (17) and (22) yields the final state of the pointer:

$$|\Phi_f\rangle = \langle \psi_f | \hat{U} | \psi_i \rangle, \tag{23}$$

where |ψ$_f$⟩ is post-selected qubit state, and |ψ$_i$⟩ is the preselected qubit state.

This can be rewritten as:

$$|\Phi_f\rangle = \frac{1}{\sqrt{2}}\left(\cos\beta \cdot \exp\left(-\frac{2\pi i}{h}\gamma\hat{p}\right) \cdot \exp\left(\frac{2\pi i}{h}\frac{k}{2}\hat{z}\right) + \sin\beta \cdot \exp\left(\frac{2\pi i}{h}\gamma\hat{p}\right) \cdot \right. \tag{24}$$

$$\left. \exp\left(-\frac{2\pi i}{h}\frac{k}{2}\hat{z}\right) \cdot \exp(-i\phi)\right) \cdot \exp\left(i\frac{\phi}{2}\right) \cdot \exp\left(-\frac{2\pi i}{h}\gamma_o\hat{p}\right) \cdot |\Phi_i\rangle,$$

where translations $\gamma_o$ and γ are functions of incidence angle θ given by eqns. (20) and (21). While the momentum boost parameter k also carries some θ-dependence, this value is tied to the misalignment between the crystal's optic axis and the R-axis. For this reason, the θ-dependence of k is not treated explicitly.

The surprising prediction of weak value theory is that a measurement of a quantum mechanical observable can yield a value that is far outside its eigenvalue spectral range by Aharonov et al. "How the result . . . " *Phys. Rev. Lett.* 60(14) 1988. This was demonstrated by Duck (1989) using a similar architecture specifically at coherency points in which:

$$\cos \phi = 1, \tag{5a) as repeated}$$

with the birefringent crystal's optic axis aligned so that the beams 155 exit the crystal 140 exactly parallel.

In these cases, eqn. (15) for the unitary operator $\hat{U}$ can be simplified and expanded to:

$$\hat{U} \approx \exp\left(-\frac{2\pi i}{h}\gamma_o \hat{p}\right) \cdot \left(1 - \frac{2\pi i}{h}\gamma \hat{p} \otimes \hat{A}\right), \tag{25}$$

where expansion of the exponential term is a valid approximation when the photon-crystal interaction is weak expressed similarly to eqn. (5b) as:

$$(\gamma/\sigma) \ll 1. \tag{26}$$

Breakdown due to incidence angle: By applying the approximate form of unitary operator $\hat{U}$ to the preselected qubit state $|\psi_i\rangle$, projecting the resulting state onto the post-selected qubit state $|\psi_f\rangle$), and re-approximating the translation γ term as an exponential, eqn. (26) can be written in a revealing form:

$$\langle \psi_f | \hat{U} | \psi_i \rangle \approx \langle \psi_f | \psi_i \rangle \cdot \exp\left(-\frac{2\pi i}{h}(\gamma_o + \gamma A_w)\hat{p}\right), \tag{27}$$

where $\hat{p}$ is the momentum operator, and the weak value of polarization basis operator $\hat{A}$ is defined as:

$$A_w = \frac{\langle \psi_f | \hat{A} | \psi_i \rangle}{\langle \psi_f | \psi_i \rangle} = \cot \varepsilon, \tag{28}$$

where angles ε is defined in eqn. (29).

One can substitute the post-selection angle as:

$$\beta = \varepsilon - \pi/4, \tag{29}$$

such that angle ε is a measure of the deviation of the post-selection state |v f⟩ away from orthogonality with the preselection state. The approximations for calculating eqn. (28) lead to a set of conditions that must be satisfied in order to be valid, namely eqn. (5b). These are called the weakness conditions. The final state of the pointer $|\Phi_f\rangle$ takes the form:

$$|\Phi_f\rangle \approx \sin\varepsilon \cdot \exp\left(-\frac{2\pi i}{h}(\gamma_o + \gamma\cot\varepsilon)\hat{p}\right) \cdot |\Phi_i\rangle. \tag{30}$$

One can observe in eqn. (30) that setting post-selection deviation ε to be very small, the weak value becomes very large. One can choose the post-selected qubit state to be nearly orthogonal to the preselected state to reduce deviation angle ε. This effectively amplifies the spatial translation of the pointer by a factor of cot ε at the cot ε of attenuating the overall amplitude by a factor of sin ε.

Then, from eqn. (10), the full expression for the position expectation value of the final pointer state is:

$$\langle z \rangle = \langle \Phi_f | \hat{z} | \Phi_f \rangle = \tag{31}$$

$$\gamma_o + \sigma \left[ \frac{\frac{\gamma}{\sigma}\sin 2\varepsilon + k\sigma\cos 2\varepsilon \cdot \sin\phi \cdot \exp\frac{(k\sigma)^2 + (\gamma/\sigma)^2}{2}}{1 - \cos 2\varepsilon \cdot \cos\phi \cdot \exp\frac{(k\sigma)^2 + (\gamma/\sigma)^2}{2}} \right].$$

To compare with weak value theory, one can consider the case in involving no momentum boost from eqn. (11a), and also that the approximation:

$$e^{-\gamma^2/2\sigma^2} \equiv \exp(-\gamma^2/2\sigma^2) \approx 1, \tag{32}$$

holds. These conditions are presented such that weak interaction in translation the translation γ satisfies the conditions in eqn. (31):

$$\langle z \rangle = \gamma_o + \gamma \frac{\sin 2\varepsilon}{1 - \left[\cos 2\varepsilon \cdot \cos\phi \cdot \exp\frac{(k\sigma)^2 + (\gamma/\sigma)^2}{2}\right]} \approx \gamma_o + \gamma\cot\varepsilon, \tag{33}$$

where the approximation on the right is valid at coherency points where eqn. (11a) applies, and the remaining s terms reduce by the relation:

$$\frac{\sin 2\varepsilon}{1 - \cos 2\varepsilon} = \cot\varepsilon. \tag{34}$$

This matches the weak value theory prediction from Duck (1989).

Alternatively, one can consider the presence of a weak momentum boost in the inverse-WVA limit, i.e., when absolute weak value is large as inequality $|A_w| \gg 1$ or, equivalently, when eqn. (14b) applies, as determined by A. G. Kofman et al. "Nonperturbative theory . . . " *Phys. Rpts.* 520 2012. In this limit, the second term dominates in eqn. (31), which reduces to:

$$\langle z \rangle = \frac{k\sigma^2 \sin\phi}{\exp\left[\frac{(k\sigma^2 + (\gamma/\sigma)^2)}{2}\right] - \cos\phi} \approx \frac{2\phi}{k\left[1 + \left(\frac{\gamma}{k\sigma^2}\right)^2\right]}, \tag{35}$$

where the approximation on the right is valid for small phase-shift $\phi \ll 1$.

This form matches the inverse-WVA curve derived in the first equation of Martínez-Rincón et al. "Ultrasensitive Inverse . . . " *Opt. Lett.* 42(13) 2017 for a modified Sagnac architecture that produces a weak momentum boost as kσ≪1 but no spatial translation as with γ/σ=0. The momentum boost parameter k of COWVAD always produces a non-zero γ-value for non-zero incidence angles. Nevertheless, eqn. (35) demonstrates that in this regime, the pointer sensitivity to crystal tilt angle (via phase-shift) is inversely proportional to the strength of the momentum boost.

The change in the expectation value of position Δ⟨z⟩ measured on the detector 160 is related to the amplitude of the crystal oscillation Δθ by:

$$\frac{\Delta\langle z\rangle}{\Delta\theta} = \frac{\Delta\langle z\rangle}{\Delta\phi}\frac{\Delta\phi}{\Delta\theta}. \tag{36}$$

In other words, the amplitude of crystal oscillation Δθ, which is proportional to the rotation rate Ω that the exemplary device 280 is designed to measure, induces a change in the relative phase-shift Δθ which is ultimately responsible for the observed pointer shift Δ⟨z⟩, which is the parameter used to derive the sought measurement of rotation rate.

The primary advantage of the exemplary embodiments is the incorporation of an optical weak-value readout that amplifies the oscillation and allows for more sensitive transduction of a rotation about the R-axis. This boost in sensitivity combined with the robustness of the measurement architecture delivers an improved CVG sensor with reliable, inexpensive technology.

While a WVA-augmented CVG has been proposed under U.S. Pat. No. 11,060,868 titled "Weak Value Amplification Coriolis Vibratory Gyroscope" that concept involves a mirrored crystal placed in the corner of a Sagnac interferometer. This exemplary concept requires fewer components and hence less balancing is required. This exemplary concept also has a greater potential for miniaturization than the aforementioned concept because the amplification factor is independent of the distance between optical components enabling the arbitrary reduction of dimensions.

CVGs are widely used in countless military and recreational applications. A successful implementation of the exemplary device 280 could result in a considerable market demand particularly for autonomous vehicle applications such as unmanned aerial vehicles, unmanned underwater vehicles, unmanned surface vehicles, etc.

While certain features of the embodiments of the invention have been illustrated as described herein, many modifications, substitutions, changes and equivalents will now occur to those skilled in the art. It is, therefore, to be understood that the appended claims are intended to cover all such modifications and changes as fall within the true spirit of the embodiments.

What is claimed is:

1. A device for measurement of rotation rate, said device comprising:
    a vertical-cavity surface-emitting laser for emitting an optical beam of photons along a drive axis orthogonal to rotation and sense axes;
    a first polarizer for pre-selection of said optical beam into equal superposition of pre-selection polarization states in horizontal and vertical planes;
    a birefringent crystal composed of uniaxial mineral crystal silicon dioxide for weakly interacting with and splitting said optical beam of photons into a mutually in-phase pair of parallel beams of photons that emerges from said birefringent crystal along said drive axis and separated along said sense axis, said optical beam intersecting said birefringent crystal at an incidence angle;
    a second polarizer for post-selection of said pair of parallel beams into post-selection polarization states nearly orthogonal to said pre-selection polarization states;
    a detector for registering said parallel beams of photons; and
    a platform onto which said laser, said first polarizer, said crystal, said second polarizer and said detector are sequentially disposed parallel to said vertical plane, wherein
    said parallel beams are distinguished by horizontal and vertical polarizations relative to said birefringent crystal, and separate by phase difference in response to the rotation rate about said rotation axis, and
    said birefringent crystal weakly interacts with said optical beam to amplify said phase difference.

2. The device according to claim 1, wherein said laser and said first polarizer combine as a polarizing laser.

3. The device according to claim 1, wherein said phase difference corresponds to peak position expectancy at coherency points of said birefringent crystal with spatial translation across said parallel beams.

4. The device according to claim 1, wherein said parallel beams are ordinary and extraordinary rays.

5. The device according to claim 4, wherein said ordinary ray varies in amplitude in said horizontal plane of said drive and sense axes, and said extraordinary ray varies in amplitude in said vertical plane of said rotation and sense axes.

* * * * *